(12) United States Patent
Karlsson

(10) Patent No.: US 7,374,492 B2
(45) Date of Patent: May 20, 2008

(54) SHAFT SUPPORT AND METHOD FOR ASSEMBLING THE SHAFT SUPPORT IN A TUBE

(75) Inventor: Göte Karlsson, Huskvarna (SE)

(73) Assignee: Husqvarna AB, Huskvarna (SE)

( * ) Notice: Subject to any disclaimer, the term of this patent is extended or adjusted under 35 U.S.C. 154(b) by 215 days.

(21) Appl. No.: 10/496,942

(22) PCT Filed: Dec. 12, 2002

(86) PCT No.: PCT/SE02/02323

§ 371 (c)(1),
(2), (4) Date: Nov. 4, 2004

(87) PCT Pub. No.: WO03/051099

PCT Pub. Date: Jun. 26, 2003

(65) Prior Publication Data

US 2005/0049053 A1 Mar. 3, 2005

(30) Foreign Application Priority Data

Dec. 17, 2001 (SE) .................................. 0104276

(51) Int. Cl.
*F16C 1/06* (2006.01)

(52) U.S. Cl. .................. 464/52; 29/455.1; 29/DIG. 44
(58) Field of Classification Search ............... 74/502.4, 74/502.5, 502.6; 464/52, 173, 53, 174; 30/276; 29/455.1, DIG. 44; 138/118.1, 119; 248/603; 403/298

See application file for complete search history.

(56) References Cited

U.S. PATENT DOCUMENTS

| 5,175,932 | A |   | 1/1993 | Lange et al. |
|---|---|---|---|---|
| 5,364,307 | A |   | 11/1994 | Shaulis ........................ 464/52 |
| 5,456,304 | A | * | 10/1995 | Colson et al. |
| 5,765,597 | A | * | 6/1998 | Kiest et al. |
| 5,839,961 | A |   | 11/1998 | Andress ....................... 464/52 |

\* cited by examiner

*Primary Examiner*—Greg Binda
(74) *Attorney, Agent, or Firm*—Pearne & Gordon LLP

(57) ABSTRACT

Arrangement in a tube for an engine powered tool for support of a drive shaft extending inside the tube. A tube shaped section (15) acts as a shaft support (14) for the drive shaft and the tube shaped section (15) is constituted by a number of sections (19) provided with ribs (16) for support of the tube shaped section (15) inside the tube. The sections (19) are connected by flexible parts (17) placed between the sections (19) to absorb movements between the sections (19).

15 Claims, 4 Drawing Sheets

SHAFT SUPPORT AND METHOD FOR ASSEMBLING THE SHAFT SUPPORT IN A TUBE

RELATED PATENT APPLICATION

This application claims the benefit of International Application Number PCT/SE02/02323, which was published in English on Jun. 26, 2003.

BACKGROUND OF THE INVENTION

The claimed invention relates to a shaft support in a tube for an engine-powered tool, for example a clearing saw or a trimmer, and a method for assembling the shaft support in the tube.

A number of different types of engine powered tools are used in order to facilitate work in forests and gardens. One type of tool that is used to increase the range of action and improve the working conditions for the operator is clearing saws, trimmers and similar tools where the working tool is placed in the end of a tube.

The tools have different working tools but all of them have the same configuration with the engine placed in one end of the tube and the working tool in the other. The length of the tube is adapted depending on the work that the tool is used for. For example is the length of the tube on a grass trimmer selected so that the operator will be able to walk upright with the working tool in suitable height over the ground while a tool for pruning of trees have a longer tube so that the operator will be able to reach the top of the tree standing on the ground. Some tools have a straight tube while some have a curved tube in order to adapt the angle of the working tool to the surface that will be worked and to improve the range of action for the tool.

Since the engine is placed in one end of the tube and the working tool in the other must the power from the engine be transferred to the working tool. This is done by a stiff or flexible drive shaft that is running inside the tube from the engine to the working tool. If a straight tube is used is it possible to use a stiff or a flexible drive shaft while a curved tube requires a flexible drive shaft, normally made of a flexible wire or a line.

In order to reduce the amount of vibrations and sound generated by the drive shaft in the tube and also to reduce the wear and risk for failure is the drive shaft supported in the tube. The vibrations and sound is generated if the drive shaft is allowed to move in radial direction inside the tube.

There are a number of different shaft supports used today. All of them are pressed into the tube whit the drive shaft placed in its right position in the support. In the patent documents DE383954SC2, U.S. Pat. No. 5,839,961A, U.S. Pat. No. 5,364,307A and U.S. Pat. No. 5,175,932A are some of the different types of shaft support where the drive shaft is placed in a circular section in the center of the shaft support. Different types of curved of angled support arms extends outwards from the circular section in order to support the circular section and the drive shaft in the tube. The support arms curved shape is a result of a compromise that will facilitate the assembling of the shaft support and the drive shaft in the tube since the curved arms are allowed to bend towards the circular section which makes it possible to press the shaft support and the drive shaft into the tube. When the shaft support and the drive shaft in its right position will the curved arms return to their normal position resting against the inside of the tube so that the circular section and the drive shaft are supported.

The existing shaft supports all have the drawback that the supporting arms that are shaped to facilitate the assembling also makes it possible for the circular section and the drive shaft to move in radial direction during use. These movements means that the support of the drive shaft not is satisfying since the movements will generate vibrations and sound.

There is therefor a need for improved shaft supports for drive shafts running inside a tube so that the amount of vibrations and sound generated from the drive shaft during use are reduced.

BRIEF SUMMARY OF THE INVENTION

The shaft support illustrated and described in this application reduces the problems described above and facilitates the assembling of the shaft support and drive shaft in the tube.

The claimed invention solves the described problem by a new design of the shaft support. The drive shaft is placed in a tube shaped section placed in the center of the shaft support. The tube shaped section is surrounded by a number of ribs extending from the tube shaped section and outwards in radial direction. The ribs are shaped like straight and stiff wings to support the tube shaped section in the tube in a reliably way. Between the wings are flexible parts placed around the tube shaped section. These flexible parts are extending outwards in radial direction from the tube shaped section but have a shorter length than the wings. The radius from the center of the shaft support to the tip of the wings are a bit bigger that the radius from center to the inside surface of the tube, the length of the ribs normally are between 1-10 millimeters longer, while the radius of the flexible parts is a bit smaller than the radius from center to the inside surface of the tube. The flexible parts will therefore not be in contact with the inside of the tube when the shaft support is assembled in the tube.

The main purpose for the ribs are to support the tube shaped section and the drive shaft in the tube while the flexible parts placed between the ribs are used for handling the movements that occurs in the tube shaped section when the shaft support is assembled in the tube because of the length of the ribs that is longer than the radius of the inside of the tube. This is the difference between the shaft support claimed in this application and the already existing shaft supports where the curved or angled arms that are supporting the drive shaft in the tube handles the movements from the assembling of the shaft support.

In one example, the length of the shaft support is such that it extends through the entire tube. In another example, the shaft support can be divided into shorter sections that are each placed at suitable positions along the tube.

The claimed shaft support comprises a tube shaped section. The diameter of the tube shaped section will change a bit depending on if the shaft support is assembled in the tube or not because of the flexible parts. The diameter of the tube shaped section must however be at least a bit longer than the diameter of the drive shaft after the shaft support is assembled in the tube to ensure that the drive shaft will be able to rotate in the tube shaped section.

The feature described above makes it possible to use a new method for assembling of the shaft support and the drive shaft in the tube. The new method for assembling is that one lateral end of the tube shaped section is sealed and the other lateral end is connected to a vacuum pump so that a vacuum is created inside the tube shaped section. The tube shaped section then shrinks because of the vacuum and the flexible parts placed around the tube shaped section. When the tube shaped section shrinks the radius from the center of the shaft support to the tip end of the ribs is reduced which makes it possible to assemble the shaft support in the tube in an easy way. When the shaft support is in the right position inside the tube the vacuum pump is turned off so that the pressure inside the tube shaped section returns to the atmospherical pressure. The tube shaped section then tries to return to its normal size. The ribs will then be pressed outwards towards the inside of the tube so that the shaft support is stabilized inside the tube.

The drive shaft is either placed in the shaft support before or after the shaft support is assembled in the tube.

BRIEF DESCRIPTION OF THE DRAWING

One embodiment of the claimed invention is illustrated in the drawings.

DESCRIPTION OF EXAMPLE EMBODIMENT

Figure 1:
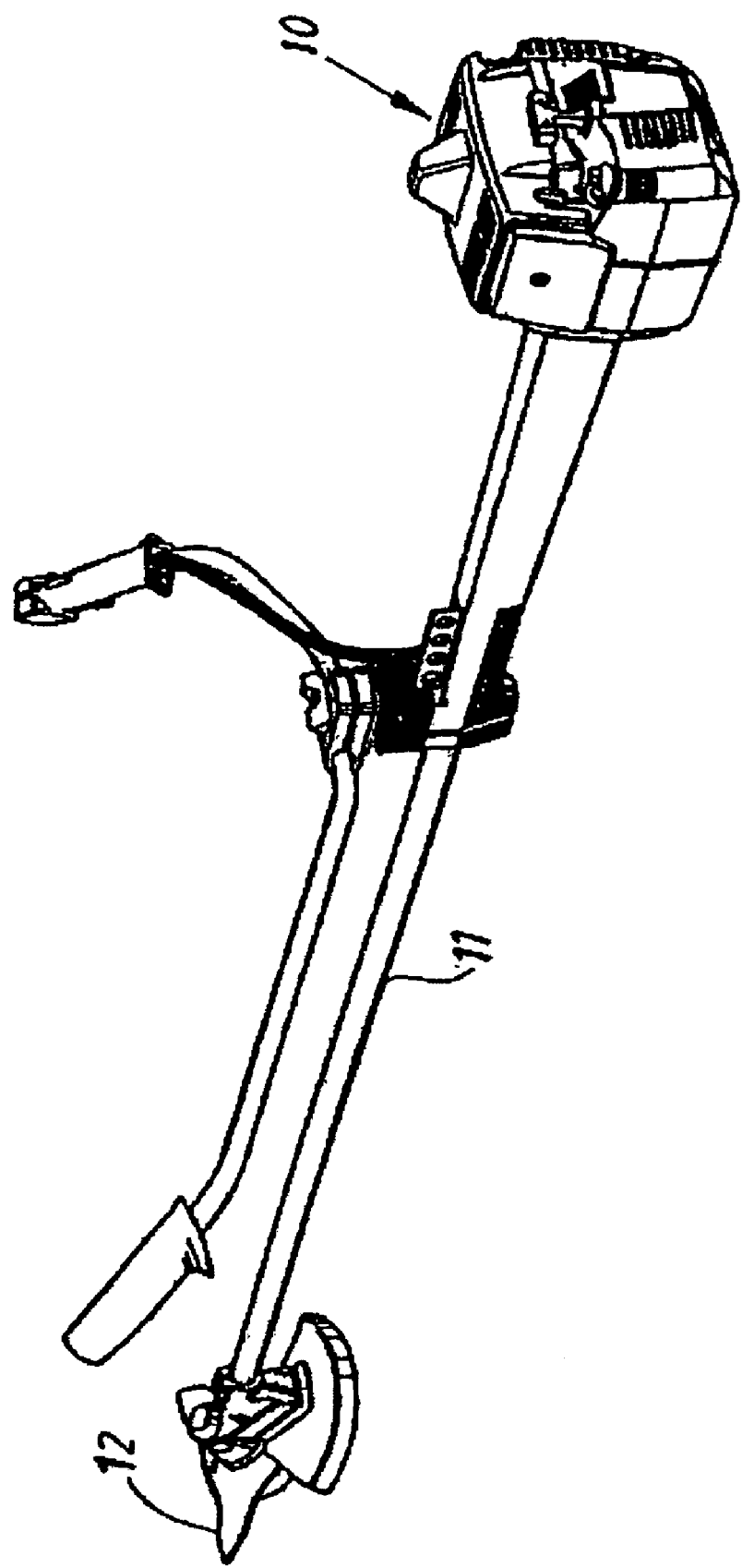
FIG. 1. Illustrates a tool where the power has to be transferred from the engine in one end of tube to the working tool in the other end of the tube.

In FIG. 1 is a tool with an engine 10 and related components placed in one end of a tube 11. The other end of the tube 10 is provided with a working tool 12, in this embodiment a saw blade for a clearing saw.

The tube 11 is hollow and in order to transfer the power from the engine 10 to the working tool 12 is a drive shaft (not shown) lead through the tube 11 from the engine 10 to the working tool 12. The tube 11 is provided with a shaft support 14 to reduce the amount of vibrations and sound generated from the drive shaft during use of the tool.

Figure 2A:
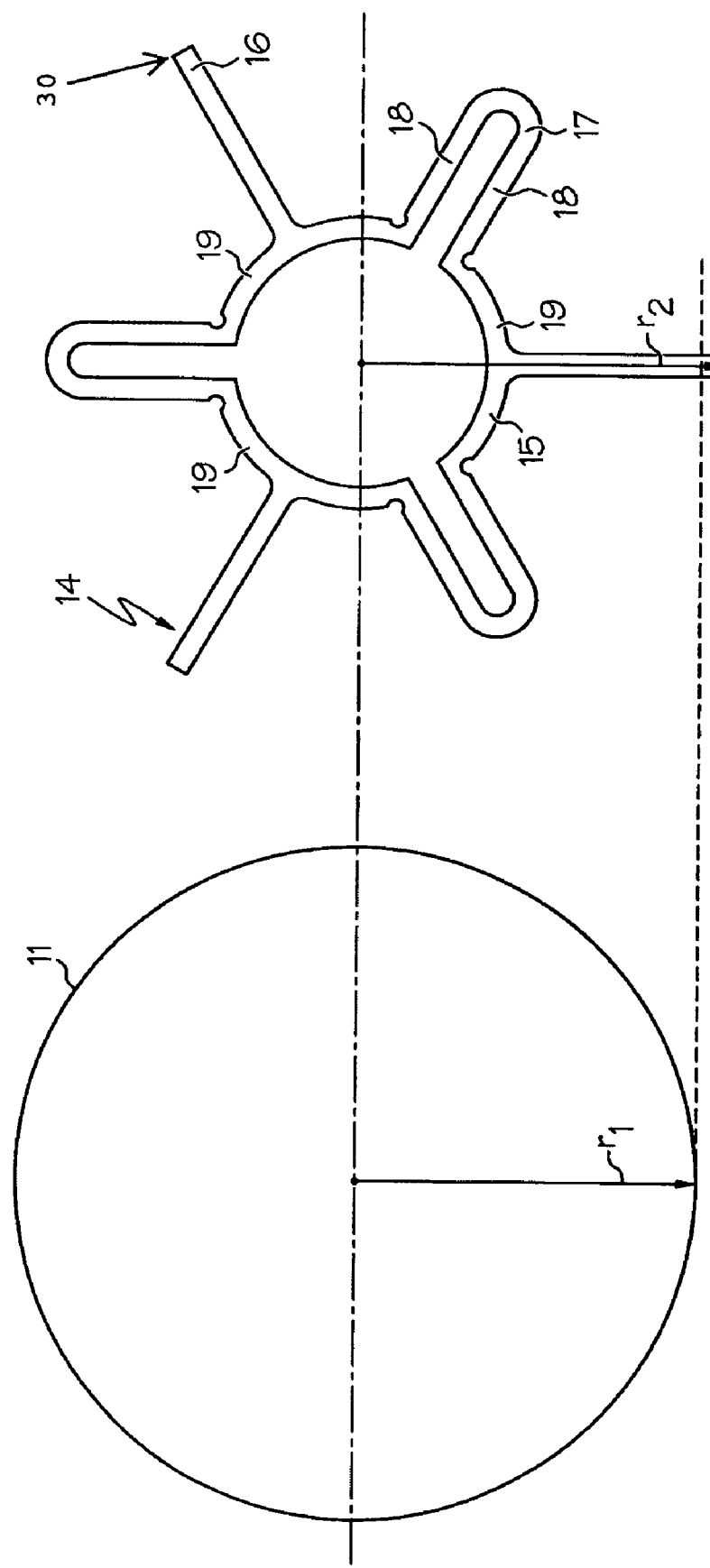
FIG. 2A. Illustrates the shaft support prior to assembly within the tube.

In FIG. 2A is a cross section of one embodiment of the claimed shaft support 14 illustrated. The drive shaft is placed in the centre of the shaft support 14 in a tube shaped section 15 (see FIG. 2B). The tube shaped section 15 is provided with ribs 16 extending outwards in radial direction from the outer surface of the tube shaped section 15. Each rib 16 includes a tip end 30 for support of the tube shaped section 15 inside the tube 11. Additionally, each rib 16 has a generally equal nominal dimension $r_2$ dimension defined as the radial distance measured from the center of the tube shaped section 15 to the tip end 30 of the at least one rib 16. Between the ribs 16 are U-shaped flexible parts 17 placed. The U-shaped flexible parts 17 are placed so that the curved part is pointing outwards in radial direction from the tube shaped section 15. The ribs 16 are shaped like straight stiff wings extending in radial direction from the axial direction of the shaft support 14. Furthermore, as shown in the example of FIG. 2A, the ribs 16 are generally symmetrical.

The tube shaped section 15 that surrounds the drive shaft 20 is created by a number of curved sections 19. The curved sections 19 are connected to each other by the ends 18 of the U-shaped flexible parts 17 so that there is a gap between the curved sections 19 that constitutes the tube shaped section 15. The gaps are consequently placed between the ends 18 of the U-shaped flexible parts 17.

As shown in FIG. 2A, length $r_2$ of the ribs 16 is a bit longer than the inside radius $r_1$ of the tube 11 while the length of the U-shaped flexible parts 17 is a bit shorter than the inside radius $r_1$ of the tube 11.

Figure 2B:
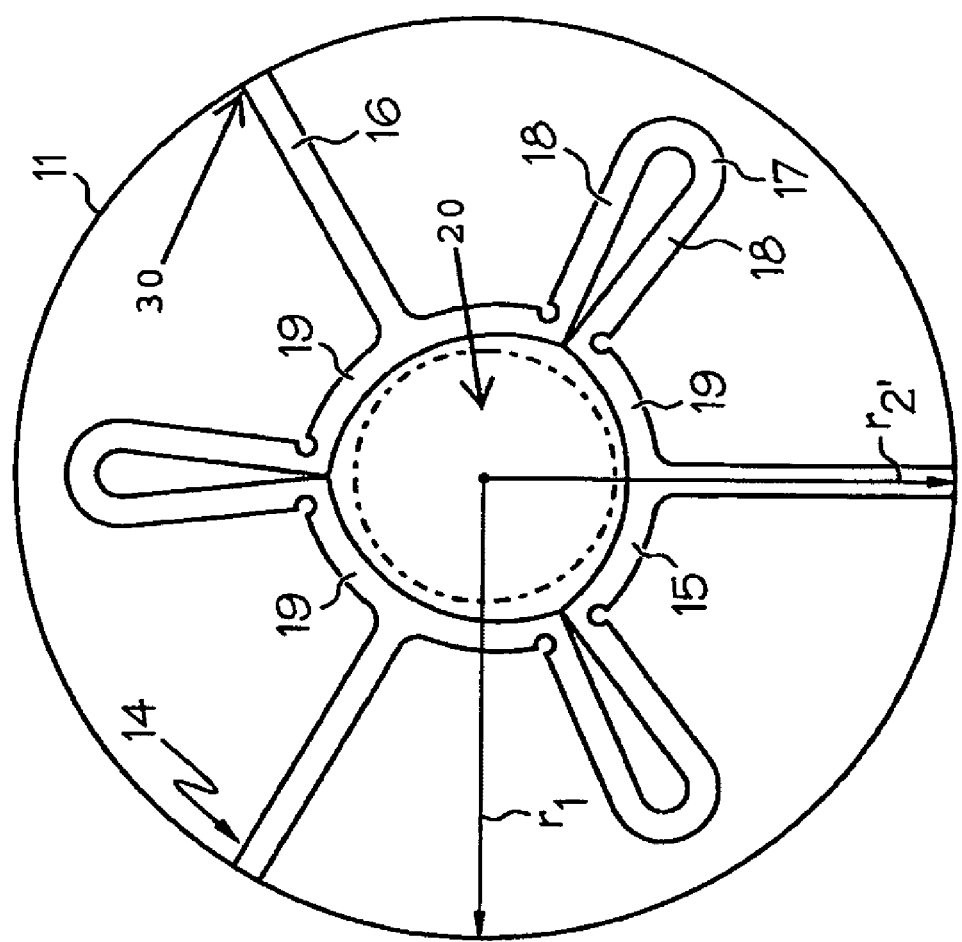
FIG. 2B. Illustrates the shaft support after assembly within the tube.

As shown in FIG. 2B, the shaft support 14 is placed inside the tube 11. The ribs 16 are than pressed in radial direction towards the centre of the shaft support 14 because of the difference in length between the ribs 16 ($r_2$) and the inside ($r_1$) of the tube 11. Thus, as shown in FIG. 2A, when the shaft support 14 is located outside of the tube 11, the nominal dimension $r_2$ of the at least one rib 16 is greater than the inner radius $r_1$ of the tube. However, when the shaft support 14 is located inside of the tube 11, the nominal dimension $r_2'$ of the at least one rib 16 is substantially equal to the inner radius $r_1$ of the tube 11. The design of the shaft support 14 makes the movement in the ribs 16 extend into movements in the curved sections 19 so that the curved sections 19 move towards the centre of the shaft support 14. The movement of the curved sections 19 in radial direction also generates a movement in the ends on the curved section 19. The U-shaped flexible parts absorb these movements by reducing the distance between the ends 18 of the U-shaped flexible part. The shaft support 14 will after the assembling inside the tube 14 have the form generally illustrated in FIG. 2B. The U-shaped flexible parts have absorbed the movements in the tube shaped section 15 by a reduced distance between the ends 18 of the U-shaped flexible parts 17. The ribs 16 will therefore be straight and acting between the tube shaped section 15 and the inside of the tube 11 50 that they provide support for the drive shaft in the tube 11. For example, as shown in FIG. 2B, each tip end 30 of the ribs 16 abuts the tube 11.

The length of the flexible parts 17 in radial direction is selected so that the flexible parts 17 will not be in contact with the inside of the tube 11 in order to facilitate the assembling of the shaft support 14 in the tube 11. The length of the flexible parts 17 affects the possibility for the flexible parts 17 to absorb the movements in the curved sections 19. Shorter length of the ends 18 reduces the possibility for the flexible part 17 to absorb the movements. The length of the flexible parted must therefore be selected to match the length of the ribs 16 and the movements in the tube shaped section 15 that the flexible parts 17 are expected to absorb.

The number of ribs 16 and flexible parts 17 could be different depending on the use of the shaft support. The shaft support 14 in FIG. 2 have three ribs 16 and three flexible parts 17 evenly spread around the circumference of the tub shaped section 15 but the number of ribs 16 and flexible parts 17 could be increased if the drive shaft needs more support inside the tube 11.

Figure 3:
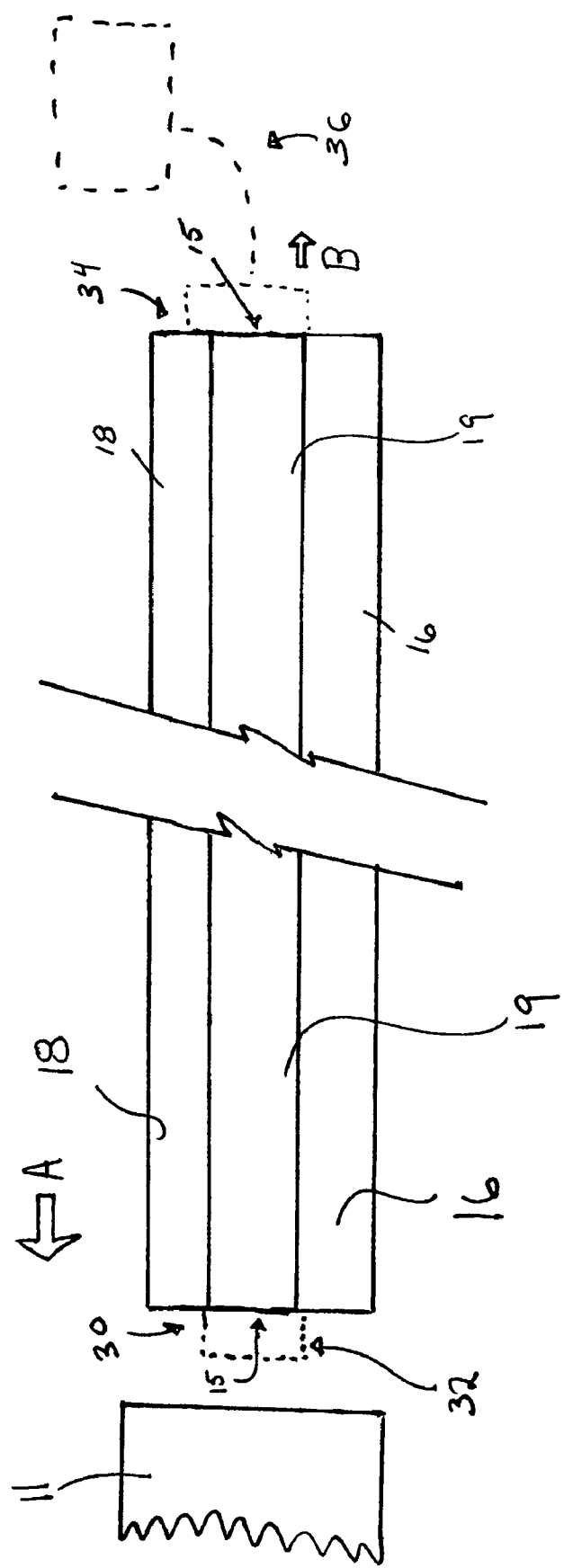
FIG. 3 Illustrates a side view of the claimed shaft support.

The feature described above makes it possible to use a new method for assembling of the shaft support (14) and the drive shaft in the tube (11). As shown in FIG. 3, the new method for assembling is that one lateral end (30) of the tube shaped section (15) is sealed (32) and the other lateral end (34) is connected to a vacuum pump (36) or the like so that at least a partial vacuum is created inside the tube shaped section (15). The tube shaped section (15) then shrinks because of the vacuum and the flexible parts (19) placed around the tube shaped section (15). When the tube shaped section (15) shrinks the radius from the center of the shaft support (14) to the tip end of the ribs (16) is reduced which makes it possible to assemble the shaft support (14) in the tube (11) in an easy way along the direction of arrow A. When the shaft support (14) is in the right position inside the tube (11) the vacuum pump (36) is turned off and/or disconnected from the tube shaped section (15) (e.g., along the direction of arrow B) so that the pressure inside the tube shaped section (15) returns to the atmospherical pressure. As can be appreciated, the seal (32) can also be removed. The tube shaped section (15) then tries to return to its normal size. The ribs (16) will then be pressed outwards towards the inside of the tube (11) so that the shaft support (14) is stabilized inside the tube (11).

The invention claimed is:

1. Arrangement in a tube (11) for an engine powered tool for support of a drive shaft extending inside the tube (11), characterised in that the drive shaft is surrounded by a tube shaped section (15) acting as a shaft support (14) for the drive shaft, said tube shaped section (15) is constituted by a number of generally symmetrical discontinuous sections (19) moveable relative to each other and each being provided with at least one rib (16) each having a tip end (30) for support of the tube shaped section (15) inside the tube (11), the at least one rib (16) being generally symmetrical and extending in a radial direction outwards from the tube shaped section (15) towards contact with the tube (11), and flexible parts (17) placed between the discontinuous sections (19) to absorb movements between the discontinuous sections (19), each of said discontinuous sections (19) being attached to an adjacent discontinuous section (19) by way of a flexible part (17), the discontinuous sections being biased away from each other by the flexible parts (17) such that the tip end (30) of the at least one rib (16) abuts the tube (11).

2. Arrangement according to claim 1, characterised in that the at least one rib (16) has a shape corresponding to straight-line edges extending in radial directions outwards from the surface of the tube shaped section (15).

3. Arrangement according to claim 1, characterised in that when the shaft support (14) is removed from the tube (11), the distance ($r_2$) from the center of the shaft support (14) to the tip end (30) of the at least one rib (16) is longer than the radius ($r_1$) from the center of the shaft support (14) to the inside of the tube (11).

4. Arrangement according to claim 1, characterised in that the flexible parts (17) are U-shaped and extending in radial direction outwards from the surface of the tube shaped section (15) with a curved part pointing outwards in relation to the center of the shaft support (14).

5. Arrangement according to claim 4, characterised in that the U-shaped flexible parts (17) are attached to the sections (19) of the tube shaped section (15) by each end (18) of the U-shaped flexible part (17), to form a gap between the sections (19).

6. Arrangement according to claim 1, characterised in that the distance from the center of the shaft support (14) to the end of the flexible part (17) in a radial direction is smaller than the radius of the inside of the tube (11).

7. Shaft support (14) for an engine powered tool, characterised in that the shaft support (14) comprises a tube shaped section (15) adapted to be supported within a tube (11) having a generally fixed inner radius ($r_1$) the tube shaped section (15) having a center and being made of a number of discontinuous sections (19) and provided with at least one rib (16) to support the tube shaped section (15) within the tube (11), the at least one rib (16) extending in a radial direction outwards from the tube shaped section (15) towards contact with the tube (11), the at least one rib (16) having a nominal dimension ($r_2$) defined as the radial distance measured from the center of the tube shaped section (15) to a tip end (30) of the at least one rib (16), said discontinuous sections (19) are connected by a number of flexible parts (17) arranged to absorb movements between the discontinuous sections (19) to permit deformation of the tube shaped section (15) to thereby permit adjustment of the nominal dimension ($r_2$) such that when the shaft support (14) is located outside of the tube (11) the nominal dimension ($r_2$) of the at least one rib (16) is greater than the inner radius ($r_1$) of the tube (11), and when the shaft support (14) is located inside of the tube (11) the nominal dimension ($r_2'$) of the at least one rib (16) is substantially equal to the inner radius ($r_1$) of the tube (11).

8. Shaft support (14) according to claim 7, characterised in that the at least one rib (16) has a shape corresponding to straight-line edges extending in radial directions outwards from the surface of the tube shaped section (15).

9. Shaft support (14) according to claim 7, characterised in that the flexible parts (17) are U-shaped and extending in a radial direction from the surface of the tube shaped section (15) with a curved part pointing outwards.

10. Shaft support (14) according to claim 9, characterised in that each end (18) of the U-shaped flexible parts (17) is connected to a section (19) of the tube shaped section (15), to form a gap between the sections (19).

11. Shaft support (14) according to claim 7, characterised in that the at least one rib (16) is longer than the flexible parts (17) in a radial direction from the center of the shaft support (14).

12. Shaft support (14) according to claim 7, characterised in that when the shaft support (14) is located outside of the tube (11), one end of the shaft support (14) is adapted to be sealed so that no air can enter the tube shaped section (15), and the other end of the shaft support (14) is adapted to be connected to a vacuum device that is sucking the air out of the tube shaped section (15) to deform the tube shaped section (15) such that the nominal dimension ($r_2$) of the at least one rib (16) is reduced so as to be less than or substantially equal to the inner radius ($r_1$) of the tube (11).

13. Shaft support (14) according to claim 7, characterised in that the at least one rib (16) of the shaft support (15) includes a plurality of ribs (16) to support the tube shaped section (15) within the tube (11), the plurality of ribs (16) each having a generally equal nominal dimension ($r_2$) defined as the radial distance measured from the center of the tube shaped section (15) to a tip end (30) of the plurality of ribs (16), wherein deformation of the tube shaped section (15) thereby permits adjustment of the nominal dimension ($r_2$) of each of the plurality of ribs (16) such that when the shaft support (14) is located outside of the tube (11) the nominal dimension ($r_2$) of the plurality of ribs (16) is greater than the inner radius ($r_1$) of the tube (11), and when the shaft support (14) is located inside of the tube (11) the nominal dimension ($r_2'$) of the plurality of ribs (16) is substantially equal to the inner radius ($r_1$) of the tube (11).

14. Method for assembling a shaft support in a tube (11), comprising the steps of:

providing a shaft support (14) that includes a tube shaped section (15) formed of a plurality of generally symmetrical discontinuous sections (19) and having at least one rib (16) with a nominal dimension ($r_2$) defined as the radial distance measured from a center of the tube shaped section (15) to a tip end (30) of the at least one rib (16);

sealing one end of the shaft support (14) so that no air can enter the tube shaped section (15);

connecting the other end of the shaft support (14) to a vacuum device;

sucking the air out of the tube shaped section (15) with the vacuum device so that the nominal dimension ($r_2$) of the at least one rib (16) is reduced;

putting the shaft support inside the tube (11); and returning the pressure inside the tube shaped section (15) to the atmospherical pressure by disconnecting the vacuum device so that the shaft support (14) expands and is stabilized in the tube (11) by abutment of the tip end (30) of the at least one rib (16) against the tube (11).

15. The method according to claim 14, characterised in that the at least one rib (16) extends in a radial direction outwards from the tube shaped section (15) towards contact with the tube (11), and further characterised in that the shaft support (14) is stabilized in the tube (11) by the at least one rib (16) when the nominal dimension ($r_2'$) is substantially equal to the radial distance ($r_1$) measured from the center of the tube shaped section (15) to the tube (11).

* * * * *